（12）United States Patent
Waggoner et al.

(10) Patent No.: US 11,765,372 B1
(45) Date of Patent: Sep. 19, 2023

(54) EFFICIENT COEFFICIENT FILM GRAIN SYNTHESIS FOR CODECS WITHOUT FILM GRAIN SYNTHESIS

(71) Applicant: Amazon Technologies, Inc., Seattle, WA (US)

(72) Inventors: Charles Benjamin Waggoner, Portland, OR (US); Hai Wei, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 66 days.

(21) Appl. No.: 17/353,188

(22) Filed: Jun. 21, 2021

(51) Int. Cl.
| | |
|---|---|
| *H04N 11/02* | (2006.01) |
| *H04N 19/46* | (2014.01) |
| *H04N 19/60* | (2014.01) |
| *H04N 19/172* | (2014.01) |
| *H04N 19/91* | (2014.01) |
| *H04N 19/124* | (2014.01) |

(Continued)

(52) U.S. Cl.
CPC ........... *H04N 19/46* (2014.11); *H04N 19/124* (2014.11); *H04N 19/172* (2014.11); *H04N 19/176* (2014.11); *H04N 19/60* (2014.11); *H04N 19/85* (2014.11); *H04N 19/91* (2014.11)

(58) Field of Classification Search
CPC ...................................................... H04N 19/46
USPC ........................................ 375/240.01–240.29
See application file for complete search history.

(56) References Cited

U.S. PATENT DOCUMENTS

| 9,438,821 | B1 * | 9/2016 | Parker .................... G06V 10/60 |
| 2004/0264766 | A1 * | 12/2004 | Pettigrew ............... H04N 5/272 |
| | | | 382/254 |

(Continued)

FOREIGN PATENT DOCUMENTS

| WO | WO-2016172314 A1 * | 10/2016 | ........... H04N 19/115 |
| WO | WO-2021122367 A1 * | 6/2021 | ........... H04N 19/117 |

OTHER PUBLICATIONS

ITU-T, "Advanced Video Coding for Generic Audiovisual Services", International Telecommunication Union, Telecommunication Standardization Sector of ITU, Recommendation ITU-T, H.264, Jun. 2019, 836 pages.

(Continued)

*Primary Examiner* — Leron Beck
(74) *Attorney, Agent, or Firm* — NICHOLSON DE VOS WEBSTER & ELLIOTT LLP

(57) ABSTRACT

Techniques for emulating frequency coefficients of film grain for video (e.g., frame) encoding are described. According to some embodiments, a computer-implemented method includes receiving a request to encode a video with film grain at a content delivery service, performing a film grain synthesis on a frame of the video with film grain to generate film grain metadata for the frame and generate a degrained frame from the frame, determining film grain emulation frequency coefficients based at least in part on the film grain metadata for the frame, performing a frequency transform on the degrained frame to generate frequency coefficients for the degrained frame, encoding the frame into an encoded frame, by the content delivery service, based at least in part on the frequency coefficients for the degrained frame and the film grain emulation frequency coefficients, and transmitting the encoded frame from the content delivery service to a viewer device.

22 Claims, 11 Drawing Sheets

(51) Int. Cl.
 *H04N 19/85* (2014.01)
 *H04N 19/176* (2014.01)

(56) References Cited

U.S. PATENT DOCUMENTS

| | | | | |
|---|---|---|---|---|
| 2006/0082649 A1* | 4/2006 | Gomila | ................ | H04N 19/117 |
| | | | | 348/E5.051 |
| 2006/0104608 A1* | 5/2006 | Llach | .................... | H04N 19/86 |
| | | | | 386/E5.052 |
| 2007/0014484 A1* | 1/2007 | MacInnis | ................ | H04N 19/85 |
| | | | | 375/E7.181 |
| 2007/0030996 A1* | 2/2007 | Winger | ................. | G06T 1/0085 |
| | | | | 375/E7.199 |
| 2007/0269125 A1* | 11/2007 | Llach | .................... | H04N 19/46 |
| | | | | 375/E7.193 |
| 2008/0152296 A1* | 6/2008 | Oh | ......................... | H04N 19/80 |
| | | | | 375/E7.193 |
| 2011/0194615 A1* | 8/2011 | Zheludkov | ........... | H04N 19/176 |
| | | | | 375/E7.026 |
| 2019/0066272 A1* | 2/2019 | Norkin | ....................... | G06T 3/20 |
| 2019/0246138 A1* | 8/2019 | Terterov | ................. | H04N 19/14 |
| 2022/0337883 A1* | 10/2022 | Grois | ................... | H04N 19/117 |

OTHER PUBLICATIONS

Norkin et al., "Film Grain Synthesis for AV1 Video Codec", Available Online at <https://norkin.org/pdf/DCC_2018_AV1_film_grain.pdf>, 2018, 10 pages.

Rivaz et al., "AV1 Bitstream & Decoding Process Specification", Version 1.0.0, The Alliance for Open Media, 2018, 681 pages.

* cited by examiner

EFFICIENT COEFFICIENT FILM GRAIN SYNTHESIS FOR CODECS WITHOUT FILM GRAIN SYNTHESIS

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public. Service providers or content creators (such as businesses, artists, media distribution services, etc.) can employ one or more data centers to deliver content (such as web sites, web content, or other digital data) to users or clients.

BRIEF DESCRIPTION OF DRAWINGS

Various embodiments in accordance with the present disclosure will be described with reference to the following drawings.

DETAILED DESCRIPTION

Figure 1:
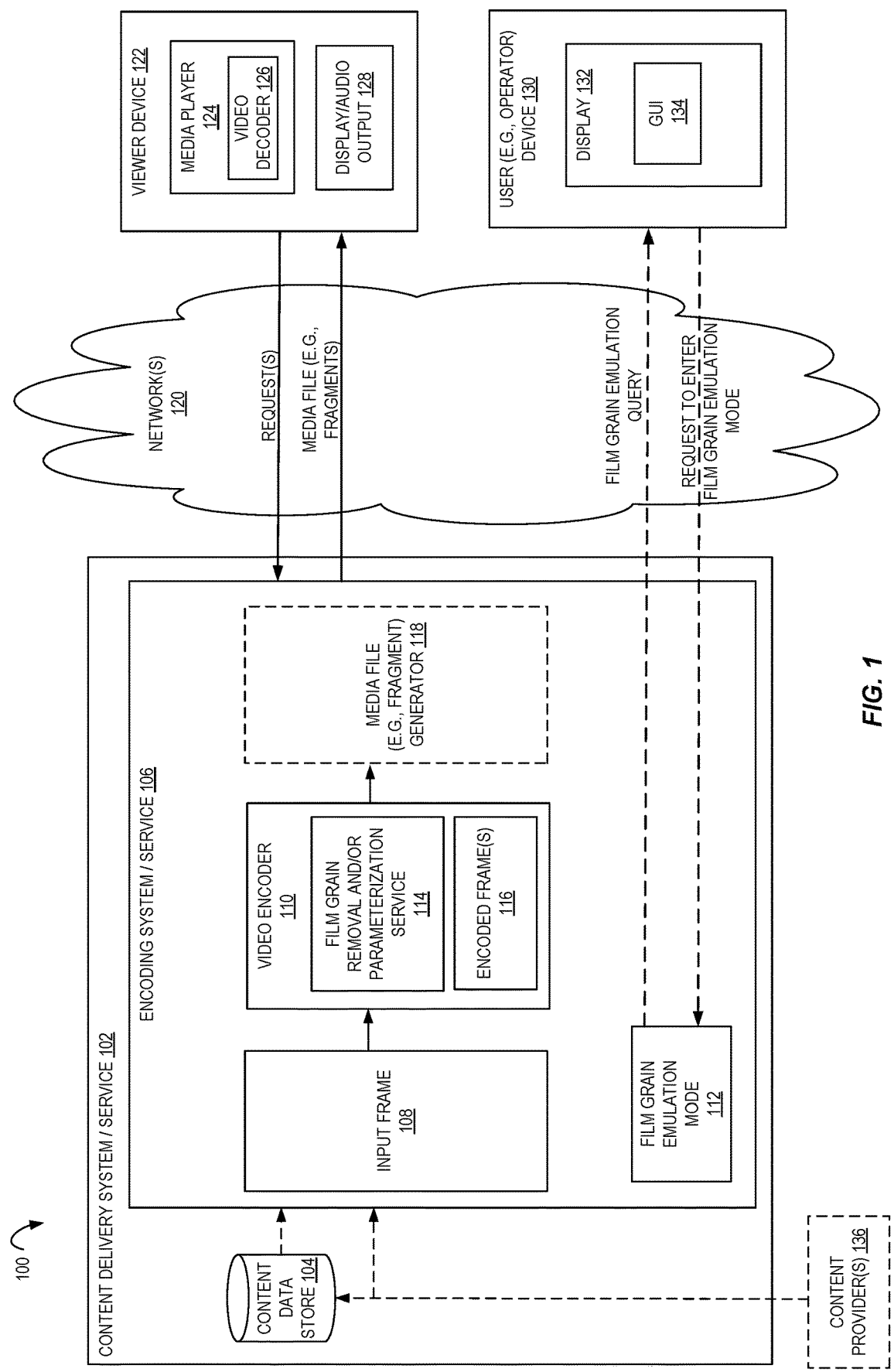
FIG. 1 is a diagram illustrating an environment including a content delivery system/service, having a video encoder including a film grain emulation mode, to send the encoded frame(s) to a viewer device according to some embodiments.

The present disclosure relates to methods, apparatus, systems, and non-transitory computer-readable storage media for emulating the frequency coefficients of film grain for video (e.g., frame) encoding. In certain embodiments, a content delivery system and/or service determines film grain emulation frequency coefficients based at least in part on film grain parameters for a video (e.g., a frame), and uses those frequency coefficients in the encode of the video (e.g., the frame). In one embodiment, the film grain parameters are film grain metadata, for example, determined according to a video encoding standard (e.g., a film grain synthesis standard or extension to a standard). In certain embodiments, the film grain (e.g., having a grain intensity and a grain pattern) is the random optical texture of processed photographic film due to the presence of small particles of a metallic silver, or dye clouds, developed from silver halide that have received enough photons. While film grain is a function of such particles (or dye clouds) it is not the same thing as such. It is an optical effect, the magnitude of which (amount of grain) depends on both the film stock and the definition at which it is observed. In certain embodiments, film grain occurs as part of using an analog film stock (e.g., celluloid) to record a video (e.g., by an analog camera). In other embodiments, film grain is added after the video (e.g., frame) is recorded on digital media (e.g., by a digital camera).

In certain embodiments, film grain (e.g., and other random noise) is a primary source of reduced quality and higher bitrate requirements for encoded video, for example, it can take more bits (e.g., two to three times as many bits) for a high-quality video encode with grain added than the same video encoded without grain. Certain embodiments of video are encoded without film grain as part of the encoded video, but parameters (e.g., as separate metadata) that indicate the film grain are sent along with the encoded video (e.g., to a viewer device), for example, such that a decoder can use the parameters (e.g., metadata) on playback to add film grain to the video that will be viewed.

In certain embodiments, the process of determining the parameters that characterize the film grain is referred to as film grain synthesis, e.g., as part of a video encoding standard. In one embodiment, with film grain synthesis, a source video including film grain is analyzed, the film grain is removed, parameters (e.g., metadata) describing the removed grain are determined, the degrained content is encoded, and the film grain parameters (e.g., metadata) are sent to the viewer device along with the encoded video. On playback, the encoded video is decoded and the grain is added back in per the parameters (e.g., metadata).

However, certain codecs (e.g., coder and/or decoder) do not support film grain synthesis, e.g., such that the metadata is not able to be utilized by the decoder. Embodiments herein allow for the emulation of frequency coefficients of film grain for video (e.g., frame) encoding, e.g., such that a decoder that does not support film grain synthesis is able to decode a video that includes film grain (e.g., such that the film grain is visible to the user to present a desired viewing experience). Embodiments herein leverage film grain synthesis technologies and use the determined parameters (e.g., metadata) to emulate film grain synthesis even where film grain synthesis is not available on playback. In one embodiment, a content delivery system and/or service performs a film grain synthesis on a frame of a video with film grain to generate film grain metadata for the frame and generate a degrained frame from the frame, determines film grain emulation frequency coefficients based at least in part on the film grain metadata for the frame, performs a frequency transform on the degrained frame to generate frequency coefficients for the degrained frame, and encodes the frame into an encoded frame based at least in part on the frequency coefficients for the degrained frame and the film grain emulation frequency coefficients, e.g., and on playback, the encoded frame (with emulated film grain therein) is decoded.

Embodiments herein may be utilized in a live and/or on-demand encoder. Embodiments herein may be utilized in a device or product with screen casting capabilities, e.g., which require reencoding. Embodiments herein may be utilized on other creatively intended noise.

A video encoder and/or decoder as discussed herein may operate according to a video encoding and/or decoding standard. In one embodiment, the video encoding and/or decoding standard is an Advanced Video Coding (AVC) standard, for example, a H.264 standard, a High Efficiency Video Coding (HEVC) standard (e.g., a H.265 standard), an Essential Video Coding (EVC) standard, or a Versatile Video Coding (VVC) standard (e.g., a H.266 standard). A standard may include an (optional) extension for film grain synthesis, but a particular viewer device (e.g., decoder thereof) may not support film grain synthesis, e.g., that particular device may not include an extension for film grain synthesis, and thus not support adding film grain back in according to the film grain synthesis.

Figure 3:
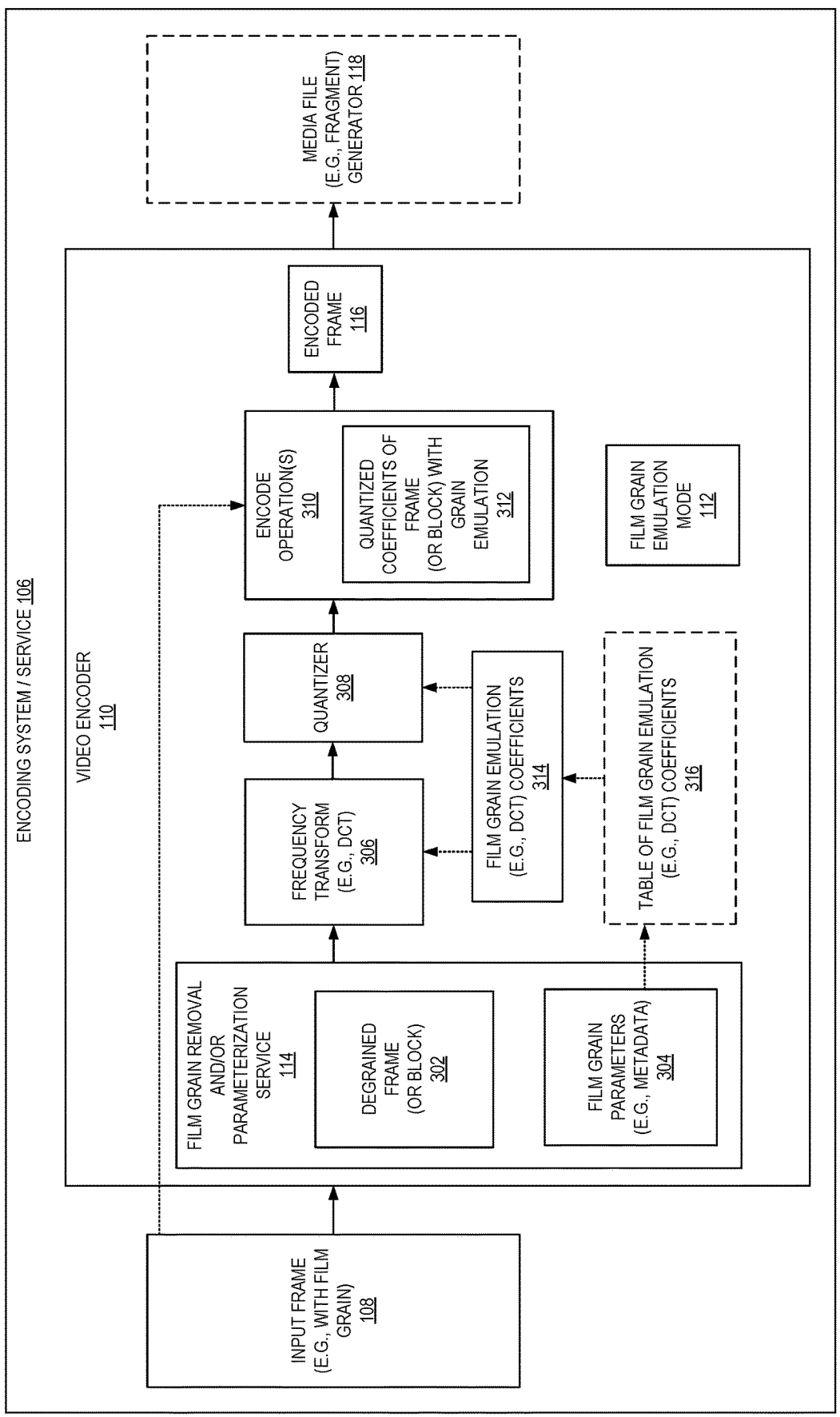
FIG. 3 is a diagram illustrating a video encoder including a film grain emulation mode that utilizes film grain emulation coefficients before quantization according to some embodiments.

FIG. 1 is a diagram illustrating an environment 100 including a content delivery system/service 102, having a video encoder 110 including a film grain emulation mode 112, to send the encoded frame(s) 116 to a viewer device 122 according to some embodiments. In certain embodiments, encoding system/service 106 operates in accordance with a video coding (e.g., encoding) standard. In certain embodiments, video decoder 126 operates in accordance with a video coding (e.g., decoding) standard. As discussed herein, certain video decoders 126 (e.g., certain medial players 124) may not support adding in film grain according to parameters (e.g., metadata) provided to the video decoder 126. Certain embodiments herein are directed to an encoding system and/or service 106 that includes a film grain emulation mode 112, e.g., that utilizes the parameters (e.g., metadata) that were to have been provided to a video decoder 126 that supports film grain synthesis to determine film grain emulation frequency coefficients (e.g., as shown in FIG. 3) based at least in part on the film grain parameters (e.g., metadata). Embodiments herein allow for the inclusion of film grain in an encoded video (e.g., frame) without the video decoder 126 in a viewer device 122 supporting (or being modified to support) film grain synthesis. Embodiments herein lower the bitrates of grainy videos, e.g., by 10%-50%.

Encoding may compress a video file (e.g., input frame(s) 108) into a plurality of compressed frames, for example, one or more an intra-coded picture frames (I-frames) (e.g., with each I-frame as a complete image), one or more predicted picture frames (P-frames or delta-frames) (e.g., with each P-frame having only the changes in the image from the previous frame), and/or one or more bidirectional predicted picture frames (B-frames) (e.g., that further saves space (e.g., bits) by using differences between the current frame and the preceding and/or following frames to specify its content). For example, with P-frames and B-frames being inter-coded pictures. In one embodiment, each single I-frame includes a plurality of inter-coded frames (e.g., P-frames and/or B-frames), e.g., as a group of pictures (GOP).

Encoding system/service 106 may include film grain removal and/or parameterization service 114 to remove the film grain from the provided video file (e.g., input frame(s) 108) and/or determine parameters (e.g., metadata) that represents the film grain that is to be included when displaying the video.

Embodiments herein provide for a mode 112 that emulates the film grain of the source. For example, by utilizing the parameters (e.g., metadata) of the film grain to (e.g., directly) determine one or more frequency coefficients that emulate the film grain, e.g., and video encoder 110 uses those film grain emulation frequency coefficients to generate encoded frame(s) 116.

Film grain parameters (e.g., metadata) may be one or any combination of:

apply_grain equal to 1 specifies that film grain should be added to this frame. apply_grain equal to 0 specifies that film grain should not be added.

reset_grain_params( ) is a function call that indicates that all the syntax elements read in film grain_params should be set equal to 0.

grain_seed specifies the starting value for the pseudo-random numbers used during film grain synthesis.

update_grain equal to 1 means that a new set of parameters should be sent. update_grain equal to 0 means that the previous set of parameters should be used.

film_grain_params_ref_idx indicates which reference frame contains the film grain parameters to be used for this frame.

E.g., it is a requirement of bitstream conformance that film grain_params_ref_idx is equal to ref_frame_idx[j] for some value of j in the range 0 to REFS_PER_FRAME−1.

Note: This requirement means that film grain can only be predicted from the frames that the current frame is using as reference frames in certain embodiments.

load_grain_params(idx) is a function call that indicates that all the syntax elements read in film_grain_params should be set equal to the values stored in an area of memory indexed by idx.

tempGrainSeed is a temporary variable that is used to avoid losing the value of grain_seed when load_grain_params is called. When update_grain is equal to 0, a previous set of parameters should be used for everything except grain_seed in certain embodiments.

num_y_points specifies the number of points for the piece-wise linear scaling function of the luma component.

E.g., it is a requirement of bitstream conformance that num_y_points is less than or equal to 14.

point_y_value[i] represents the x (luma value) coordinate for the i-th point of the piecewise linear scaling function for luma component. The values are signaled on the scale of 0 to 255 in certain embodiments. (E.g., in case of 10-bit video, these values correspond to luma values divided by 4, and in case of 12-bit video, these values correspond to luma values divided by 16.)

If i is greater than 0, it is a requirement of bitstream conformance that point_y_value[i] is greater than point_y_value[i−1] (this ensures the x coordinates are specified in increasing order) in certain embodiments.

point_y_scaling[i] represents the scaling (output) value for the i-th point of the piecewise linear scaling function for luma component.

chroma_scaling_from_luma specifies that the chroma scaling is inferred from the luma scaling.

num_cb_points specifies the number of points for the piece-wise linear scaling function of the Cb component.

E.g., it is a requirement of bitstream conformance that num_cb_points is less than or equal to 10.

Note: When chroma_scaling_from_luma is equal to 1, it is still allowed for num_y_points to take values up to 14. This means that the chroma scaling also needs to support up to 14 points in certain embodiments.

point_cb_value[i] represents the x coordinate for the i-th point of the piece-wise linear scaling function for Cb component. The values are signaled on the scale of 0 to 255 in certain embodiments.

If i is greater than 0, it is a requirement of bitstream conformance that point_cb_value[i] is greater than point_cb_value[i−1] in certain embodiments.

point_cb_scaling[i] represents the scaling (output) value for the i-th point of the piecewise linear scaling function for Cb component.

num_cr_points specifies represents the number of points for the piece-wise linear scaling function of the Cr component.

E.g., it is a requirement of bitstream conformance that num_cr_points is less than or equal to 10.

If subsampling_x is equal to 1 and subsampling_y is equal to 1 and num_cb_points is equal to 0, it is a requirement of bitstream conformance that num_cr_points is equal to 0 in certain embodiments.

If subsampling_x is equal to 1 and subsampling_y is equal to 1 and num_cb_points is not equal to 0, it is a requirement of bitstream conformance that num_cr_points is not equal to 0 in certain embodiments.

Note: These requirements ensure that for 4:2:0 chroma subsampling, film grain noise will be applied to both chroma components, or to neither in certain embodiments. There is no restriction for 4:2:2 or 4:4:4 chroma subsampling in certain embodiments.

point_cr_value[i] represents the x coordinate for the i-th point of the piece-wise linear scaling function for Cr component. The values are signaled on the scale of 0 to 255 in certain embodiments.

If i is greater than 0, it is a requirement of bitstream conformance that point_cr_value[i] is greater than point_cr_value[i−1] in certain embodiments.

point_cr_scaling[i] represents the scaling (output) value for the i-th point of the piecewise linear scaling function for Cr component.

grain_scaling_minus_8 represents the shift−8 applied to the values of the chroma component. The grain_scaling_minus_8 can take values of 0 to 3 and determines the range and quantization step of the standard deviation of film grain in certain embodiments.

ar_coeff_lag specifies the number of auto-regressive coefficients for luma and chroma.

ar_coeffs_y_plus_128[i] specifies auto-regressive coefficients used for the Y plane.

ar_coeffs_cb_plus_128[i] specifies auto-regressive coefficients used for the U plane.

ar_coeffs_cr_plus_128[i] specifies auto-regressive coefficients used for the V plane.

ar_coeff_shift_minus_6 specifies the range of the auto-regressive coefficients. Values of 0, 1, 2, and 3 correspond to the ranges for auto-regressive coefficients of [−2, 2), [−1, 1), [−0.5, 0.5) and [−0.25, 0.25) respectively.

grain_scale_shift specifies how much the Gaussian random numbers should be scaled down during the grain synthesis process.

cb_mult represents a multiplier for the Cb component used in derivation of the input index to the Cb component scaling function.

cb_luma_mult represents a multiplier for the average luma component used in derivation of the input index to the Cb component scaling function.

cb_offset represents an offset used in derivation of the input index to the Cb component scaling function.

cr_mult represents a multiplier for the Cr component used in derivation of the input index to the Cr component scaling function.

cr_luma_mult represents a multiplier for the average luma component used in derivation of the input index to the Cr component scaling function.

cr_offset represents an offset used in derivation of the input index to the Cr component scaling function.

overlap_flag equal to 1 indicates that the overlap between film grain blocks shall be applied. overlap_flag equal to 0 indicates that the overlap between film grain blocks shall not be applied.

clip_to_restricted_range equal to 1 indicates that clipping to the restricted (studio) range shall be applied to the sample values after adding the film grain (see the semantics for color range for an explanation of studio swing). clip_to_restricted_range equal to 0 indicates that clipping to the full range shall be applied to the sample values after adding the film grain.

In certain embodiments, a YPbPr color space is used in analog component video and its digital version YCbCr is used in digital video, e.g., where Cb/Pb and Cr/Pr are deviations from grey on blue-yellow and red-cyan axes, respectively, whereas U and V are blue-luminance and red-luminance differences, respectively. For example, "YUV" is a color space (e.g., color encoding scheme) that may be used as part of a color image pipeline. In certain embodiments, the selected color space encodes a color image or video taking human perception into account, allowing reduced bandwidth for chrominance components, and generally enabling transmission errors or compression artifacts to be more efficiently masked by the human perception than using a "direct" red green blue (RGB) representation. A color space may encode brightness information (e.g., luma component Y) separately from color information (e.g., chrominance components U and V). YUV may be used as a general term encompassing (i) YUV-analog phase alternating line (PAL) encoding, (ii) YIQ-analog national television system committee (NTSC) encoding, and (iii) YCbCr-digital encoding.

In certain embodiments, a film grain synthesis (e.g., process) includes inputs of: variables w and h specifying the width and height of the frame, and variables subX and subY specifying the subsampling parameters of the frame. In certain embodiments, film grain synthesis (e.g., process) modifies the arrays Out Y, Out U, Out V (Out YUV) to add film grain noise as follows:

The variable RandomRegister (used for generating pseudo-random numbers) is set, e.g., equal to grain_seed.

The variable GrainCenter is set, e.g., equal to 128<<(BitDepth−8).

The variable GrainMin is set, e.g., equal to =−GrainCenter.

The variable GrainMax is set, e.g., equal to (256<<(BitDepth−8))−1−GrainCenter.

A generate grain process is invoked.

A scaling lookup initialization process is invoked.

An add noise process is invoked with w, h, subX, and subY as inputs.

An encoding algorithm (e.g., specified by a video encoding standard) may select between inter and intra coding for (e.g., block-shaped) regions of each picture (e.g., frame 108). In certain embodiments, inter coding (e.g., as indicated by an "inter" mode) uses motion vectors for (e.g., block-based) inter prediction from other pictures (e.g., frames) to exploit temporal statistical dependencies between different pictures. Reference pictures (e.g., reference frames) may be stored in a reference picture buffer in encoding system/service 106. In certain embodiments, intra coding uses various spatial predictions to exploit spatial statistical dependencies in the source signal for a single picture (e.g., frame). In certain embodiments, motion vectors and intra prediction modes are specified for a variety of block sizes in the picture. In certain embodiments, the prediction residual is then further compressed using a (e.g., frequency) transform to remove spatial correlation inside the transform block before it is quantized, producing an irreversible process that typically discards less important visual information while forming a close approximation to the source samples. In certain embodiments, the motion vectors or intra prediction modes are combined with the quantized transform coefficient information and encoded, e.g., using either variable length coding or arithmetic coding.

An encoding mode (e.g., to be used to encode a particular macroblock of a frame) may include one, all, or any combination of the following: direct mode, inter mode, or intra mode. A direct mode may cause encoding with an inter prediction for a block for which no motion vector is decoded. Examples of two direct prediction modes are spatial direct prediction mode and temporal prediction mode. An inter mode (e.g., sub-mode) may include a (e.g., luminance) block partition size, e.g., 16×16, 16×8, 8×16, or 8×8 (pixels×pixels). An inter mode may use a transform, e.g., a 4×4 transform or 8×8 transform. An intra mode (e.g., sub-mode) may include a (e.g., luminance) block partition size, e.g., intra4×4, intra8×8 and intra16×16. For example, intra4×4 may include further prediction sub-modes of vertical, horizontal, DC, diagonal-down-left, diagonal-down-right, vertical-right, horizontal-down, vertical-left, and/or horizontal-up.

An encoding mode may be used to encode a particular slice of a frame, e.g., where a slice is a spatially distinct region of a frame that is encoded separately from any other region in the same frame and/or where a slice is a plurality of macroblocks (e.g., a sequence of macroblock pairs).

In certain embodiments, encoding system/service 106 includes a field, that when set, causes entry to film grain emulation mode 112 (e.g., film grain preservation mode). In one embodiment, storing a first value into field for film grain emulation mode 112 causes the video encoder 110 to generate film grain emulation frequency coefficients to generate encoded frame(s) 116, for example, and storing a second, different value into the field causes the video encoder 110 to instead package film grain parameters (e.g., metadata) along with the encoded frames 116 (e.g., frames encoded without film grain therein), e.g., for sending to viewer device 122. In certain embodiments, film grain removal and/or parameterization service 114 is to remove the film grain from the provided video file (e.g., input frame(s) 108) and/or determine parameters (e.g., metadata) that represents the film grain that is to be included when displaying the video. In certain embodiments, the film grain parameters (e.g., metadata) are then (e.g., when in film grain emulation mode 112) used to determine film grain emulation frequency coefficients, e.g., before encoding of the video (e.g., frame).

The depicted content delivery system/service 102 includes a content data store 104, which may be implemented in one or more data centers. In one embodiment, the media file (e.g., video file that is to be viewed by the viewer device 122) is accessed (for example, from the content data store 104 or directly from a content provider 136, e.g., as a live stream) by video encoder 110 (e.g., by media file (e.g., fragment) generator 118). In certain embodiments, the (e.g., client) viewer device 122 requesting the media file (e.g., fragment(s) of media) from content delivery system/service 102 causes the encoding system/service 106 (e.g., video encoder 110 thereof) to encode the video file, e.g., into a compressed format for transmittal on network(s) 120 to viewer device 122. In one embodiment, the media file generator 118 generates one or more subsets (e.g., frames, fragments, segments, scenes, etc.) of the media file (e.g., video), e.g., beginning with accessing the media file and generating the requested media (e.g., fragment(s)). In one embodiment, each fragment includes a plurality of video frames.

In certain encoding embodiments, a frequency transformation on pixel values of a frame (or image) generates frequency coefficient values, and a quantization on the frequency coefficient values generates quantized frequency coefficient values that are then encoded. As one example, a frequency transformation is performed on a block of pixel values (e.g., an 8 pixel by 8 pixel block of 64 pixel values). In certain embodiments, a frequency transformation is a discrete cosine transform (DCT).

In certain embodiments, the film grain parameters (e.g., metadata) are (e.g., when in in film grain emulation mode 112) used to determine film grain emulation frequency coefficients, e.g., before encoding of the video (e.g., frame). Certain embodiments herein define repeatable film grain emulation frequency coefficients (e.g., for DCT and/or inverse DCT (iDCT)) and/or other frequency transform patterns that simulate kinds of grain, e.g., without increasing bitrate. Further examples of this are discussed in reference to FIGS. 3-4.

In FIG. 1, content delivery system/service 102 is coupled to viewer device 122 and user device 130 via one or more networks 120, e.g., a cellular data network or a wired or wireless local area network (WLAN).

In certain embodiments, content delivery system/service 102 (e.g., video encoder 110 thereof) is to send a query (e.g., asking if the film grain emulation mode 112 is desired) to user (e.g., operator) device 130, for example, and the user device 130 (e.g., in response to a command from a user of the device 130) is to send a response (e.g., an indication to enter or not enter "film grain emulation" mode 112). Depicted user device 130 includes a display 132 having a graphical user interface (GUI) 134, e.g., to display a query for video encoder 110 to enter (or not enter) film grain emulation mode 112.

Depicted viewer device 122 (e.g., where the viewer is a customer of user (e.g., operator) of device 130) includes a media player 124 having a video decoder 126 to decode the media file (e.g., fragment) from the content delivery system/service 102, e.g., to display video and/or audio of the media file on display and/or audio output 128, respectively. As discussed herein, the decoder 126 may not support adding film grain to the video it is decoding, e.g., not support adding film grain based on film grain parameters (e.g., metadata sent along with, but separate data from, encoded frame(s) 116 (e.g., frames in media fragments)).

Figure 2:
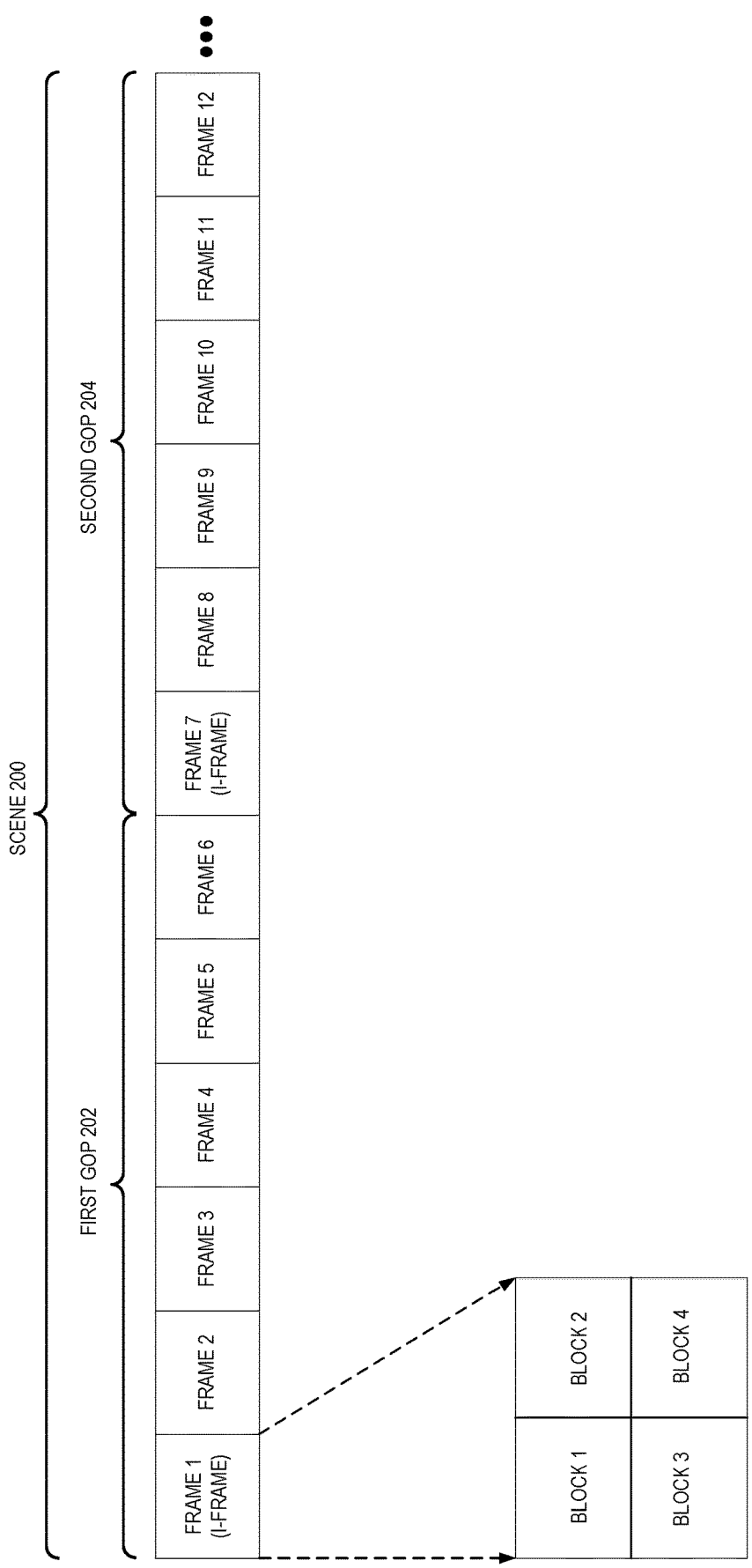
FIG. 2 is a diagram illustrating a scene having a plurality of groups of pictures, and a frame formed from a plurality of blocks (e.g., macroblocks) according to some embodiments.

FIG. 2 is a diagram illustrating a scene 200 having a plurality of groups of pictures 202, 204, and a frame (frame 1) formed from a plurality of blocks (blocks 1-4) (e.g., macroblocks) according to some embodiments. The number of scenes, GOPs (frames therein), and blocks are merely examples, e.g., it should be understood that any number of scenes, GOPs (frames therein), and blocks may be utilized.

In some embodiments, a macroblock is a proper subset of pixels of a frame used as the basic processing unit of the video encoding/decoding. An example macroblock is a (e.g., 16×16) block of (e.g., 256) luma samples and two corresponding blocks of chroma samples. A macroblock can be further partitioned for inter prediction. In one embodiment, the selection of the size of inter prediction partitions (e.g., as an encoding mode) is a result of a trade-off between the coding gain provided by using motion compensation with smaller blocks and the quantity of data needed to represent the data for motion compensation. The inter prediction process can form segmentations for motion representation that as smaller than a macroblock, e.g., as small as 4×4 luma samples in size, using motion vector accuracy of one-quarter of the luma sample grid spacing displacement. The process for inter prediction of a sample block can also involve the selection of the picture to be used as the reference picture from a number of stored previously-decoded pictures (e.g., reference frame(s)). In certain embodiments, motion vectors are encoded differentially with respect to predicted values formed from nearby encoded motion vectors. In one embodiment, an encoder calculates appropriate motion vectors and other data elements represented in the video data stream. This motion estimation process in the encoder and/or the selection of whether to use inter prediction for the representation of each region of the video content may be specified by an encoding standard.

In certain embodiments, each pixel value in a frame is converted from a first format (e.g., corresponding to a value scale of a given bit width) to a second, different format (e.g., corresponding to a different value scale of a different, given bit width), for example, pixel values converted from 10-bit wide values to 8-bit wide values.

FIG. 3 is a diagram illustrating a video encoder 110 including a film grain emulation mode 112 that utilizes film grain emulation (e.g., frequency) coefficients 314 before quantization according to some embodiments. In certain embodiments, video encoder system/service 106 (e.g., film grain removal and/or parameterization service 114 thereof) is to, for an input frame that is to include film grain (e.g., an input frame that cumulatively includes film grain therein in the pixel values), generate a degrained frame 302 (e.g., of pixel values) (e.g., a degrained block of a plurality of blocks of that frame) and/or film grain parameters 304 (e.g., metadata). In certain embodiments, the film grain parameters 304 (e.g., metadata) are not pixel values or frequency coefficients.

In certain embodiments, the degrained frame's 302 pixel values are input into frequency transform 306 component that performs an (e.g., invertible) transform to concentrate randomness into fewer, decorrelated parameters, e.g., the discrete cosine transform (DCT). In certain embodiments, the output from frequency transform 306 is quantized by quantizer 308 component (e.g., according to a corresponding quantization matrix). In certain embodiments, the output (e.g., quantized coefficients of frame (or block) with grain emulation 312) from the quantizer 308 is then encoded by encode operation(s) 310 to generate encoded frame 116 (e.g., that includes emulated film grain therein instead of as separate "film grain metadata"). In certain embodiments, the quantization parameter (QP) is a value that sets the amount of compression for every block (e.g., macroblock) in a frame, for example, with a large QP value indicating that there will be higher quantization by quantizer 308, and thus more compression and lower quality, and a lower QP value indicating the opposite. In one embodiment, the possible QP values range from 0 to 51, e.g., according to a (e.g., H.264 or H.265) video encoding (e.g., compression) standard. The embodiments herein may be performed once for brightness pixel values (e.g., of luma component Y) and once for each set of color pixel values (e.g., once for chrominance component U and once for chrominance component V).

In certain embodiments, a degrained frame is a set of pixel values (e.g., luminance pixel values and/or chrominance pixel values), and those pixel values are converted to the frequency domain by frequency transform 306 (e.g., DCT). Table 1 is an example of frequency coefficient values (e.g., for a degrained frame). Table 2 is an example of film grain emulation frequency coefficients 314, e.g., as determined for film grain parameters 304. Table 3 is an example of adding each film grain emulation frequency coefficient of the first set of film grain emulation frequency coefficients of Table 2 to a corresponding frequency coefficient of each of the plurality of blocks of the degrained frame of Table 1 to form coefficient matrix of Table 3.

TABLE 1

| -11 | -51 | 1 | -3 | 0 | 0 | 0 | 0 |
|---|---|---|---|---|---|---|---|
| -51 | 1 | 2 | 0 | 0 | 0 | 0 | 0 |
| 1 | 2 | 0 | 0 | 0 | 0 | 0 | 0 |
| -4 | 0 | 0 | 0 | 0 | 0 | 0 | 0 |
| 0 | 0 | 0 | 0 | 0 | 0 | 0 | 0 |
| -1 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

TABLE 2

| 0 | 0 | 0 | 0 | 0 | 0 | 0 | 0 |
|---|---|---|---|---|---|---|---|
| 0 | 0 | 0 | 0 | 0 | 0 | 1 | 0 |
| 0 | 0 | -1 | -1 | 0 | 0 | 0 | 0 |
| 0 | 0 | -1 | 0 | 0 | 0 | 0 | 0 |
| 0 | 1 | -1 | 0 | 0 | 0 | 0 | 0 |
| 0 | 0 | 0 | 0 | 0 | 0 | 0 | -1 |
| 0 | 1 | 1 | 0 | 1 | 0 | 0 | -1 |
| -1 | 1 | 0 | 0 | 0 | -1 | 0 | 0 |

TABLE 3

| -11 | -51 | 1 | -3 | 0 | 0 | 0 | 0 |
|---|---|---|---|---|---|---|---|
| -51 | 1 | 2 | 0 | 0 | 0 | 1 | 0 |
| 1 | 2 | -1 | -1 | 0 | 0 | 0 | 0 |
| -4 | 0 | -1 | 0 | 0 | 0 | 0 | 0 |
| 0 | 1 | -1 | 0 | 0 | 0 | 0 | 0 |
| -1 | 0 | 0 | 0 | 0 | 0 | 0 | -1 |
| 0 | 1 | 1 | 0 | 1 | 0 | 0 | -1 |
| -1 | 1 | 0 | 0 | 0 | -1 | 0 | 0 |

In certain embodiments, the coefficients of a frame (or block) with grain emulation are quantized by quantizer 308, e.g., to form quantized coefficients of frame (or block) with grain emulation 312. In certain embodiments, the encoding is performed on the quantized coefficient matrix 312.

In certain embodiments, a table of film gram emulation (e.g., frequency) coefficients 316 is included. In certain embodiments, table 316 is indexed by film grain parameters (e.g., metadata), e.g., where the film grain parameters 304 are used to look-up the corresponding set of film grain emulation (e.g., DCT) coefficients (e.g., the set in Table 2 above). Table 316 is populated before using video encoder 110 in certain embodiments. In certain embodiments, table 316 is indexed by other data (e.g., in addition to or alternatively to film grain parameters (e.g., metadata)), e.g., where that data is used to look-up the corresponding set of film grain emulation (e.g., DCT) coefficients (e.g., multiple sets similar to the set in Table 2 above). For example, indexed by a size of a block of a plurality of blocks of the frame (e.g., and the block's film grain parameters).

In certain embodiments, a first set of film grain emulation coefficients is for luminance (e.g., luma component Y) and one or more (e.g., two, respectively for chroma components U and V) different sets of film grain emulation coefficients are for chrominance, e.g., and/or different quantization parameters for each. In one embodiment, a codec predicts chroma from luma and thus the set of film grain emulation coefficients for luma are determined (e.g., during rate-distortion optimization (RDO)) from the set of film grain emulation coefficients for luma.

In certain embodiments, an autoregressive (AR) process is performed (e.g., according to an encoding standard) (e.g., performed on AR coefficients and stored Gaussian noise values) to generate a (e.g., two-dimensional) (e.g., 64 pixel× 64 pixel) luma film grain template (e.g., and two (e.g., 32 pixel×32 pixel) chroma film grain templates). In certain embodiments, the (e.g., two-dimensional) template(s) of film grain is used to generate (e.g., two-dimensional) film grain emulation (e.g., DCT) coefficients, for example, a proper subset of the template is used, e.g., based on a search for the easiest to encode (e.g., two-dimensional) section out of that template.

Although the above is discussed for frames, one of ordinary skill in the art should understand that this is applicable to other granularities, e.g., a per block granularity for a single frame formed from a plurality of blocks.

As one example, input frame 108 is an intra-coded frame (e.g., where all blocks thereof are of the same quantization parameter (QP)). In this example, film grain removal and/or parameterization service 114 (e.g., tools) is used to generate a set of parameters (e.g., metadata) 304 that would have been separate data from encoded frame 116 (e.g., not encoded within encoded frame 116). In certain embodiments, instead of adding parameters 304 as metadata, the video encoder 110 determines an overlay of coefficients 314 that emulate the removed grain. In certain embodiments, grain is high frequency, so those coefficients will be in the lower right corner of a quantized block, e.g., in lower right corner of quantized version of Table 3 above. In certain embodiments, adding the same coefficients to all blocks in a frame will yield a similar grain pattern across the frame, and by having the same sequence of coefficients in those blocks (e.g., every block) and/or in multiple frames, that sequence will be repeated and an entropy coding feature of the video encoder 110 will very efficiently compress that repeated string. This results in a similar quality as encoding the grain directly, but at a much lower bitrate.

In certain embodiments, each quantized value is a coefficient (e.g., DCT) value (e.g., from Table 3 above) divided by a corresponding value from a quantization matrix, and then that result rounded to the nearest integer for each resultant in a quantized coefficient matrix.

When QP varies across the frame, adjustments are made to the film grain emulation (e.g., frequency) coefficients 314 in certain embodiments. Certain embodiments herein influence the selection of the QP. Certain embodiments herein influence adaptive quantization decisions, e.g., to find the best net combination of using film grain emulation (e.g., frequency) coefficients 314 (e.g., as an overlay) versus encoding in the native frequency.

In certain embodiments, variation in coded block sizes require different coefficients, for example, such that a block size determination is influenced by the efficiency of film grain insertion, e.g., biasing towards less variability in block sizes.

In certain embodiments, a video encoder is extended to have access to both the original frame 108 (e.g., as shown by the dotted arrow from input frame 108 to encode operations 310) and degrained frame 302 to implement hybrid strategies that combine source and overlaid film grain emulation (e.g., frequency) coefficients 314 in different frames and/or different areas of a single frame.

In certain embodiments (e.g., where synthesizing film grain emulation (e.g., frequency) coefficients is too complex to be done dynamically), film grain emulation (e.g., frequency) coefficients are provided (e.g., determined) in advance, e.g., for common film stocks and/or common film grain.

In certain embodiments, predicted blocks (e.g., in P and B frames) will carry over some grain pattern from the areas they are predicted from, which will eliminate the need to apply frequency overlays to predicted blocks. In certain embodiments, the video encoder's 110 rate-distortion optimization (RDO) decisions incorporate that, e.g., with the net effect of more bits being spent on intra-coded blocks versus inter-coded blocks than in an encoding that does not implement this disclosure.

In certain embodiments, film grain emulation (e.g., frequency) coefficients (e.g., as in Table 2) are to be randomized (e.g., by flipping the sign bit on a proper subset of the coefficients) to avoid the block structure basis pattern becoming visible. In one embodiment, a randomizer is utilized to flip one sign bit in each matrix of film grain emulation (e.g., frequency) coefficients. In certain embodiments, alternate coefficients are selected to be as similar as feasible from the perspective of an entropy coder.

While grain is often consistent across a frame, it may not be, e.g., where graphics or letterboxing are present. Thus, in certain embodiments the film grain emulation (e.g., frequency) coefficients are selectively applied to only some regions of a frame, e.g., where The FGS metadata captures this.

In certain embodiments, using the FGS metadata makes this technique faster to compute and easier to develop. For example, such that an encoding system/service uses the same film grain removal and parameterization service 114 when encoding to different codecs, different frame sizes, and different bitrates.

Figure 4:
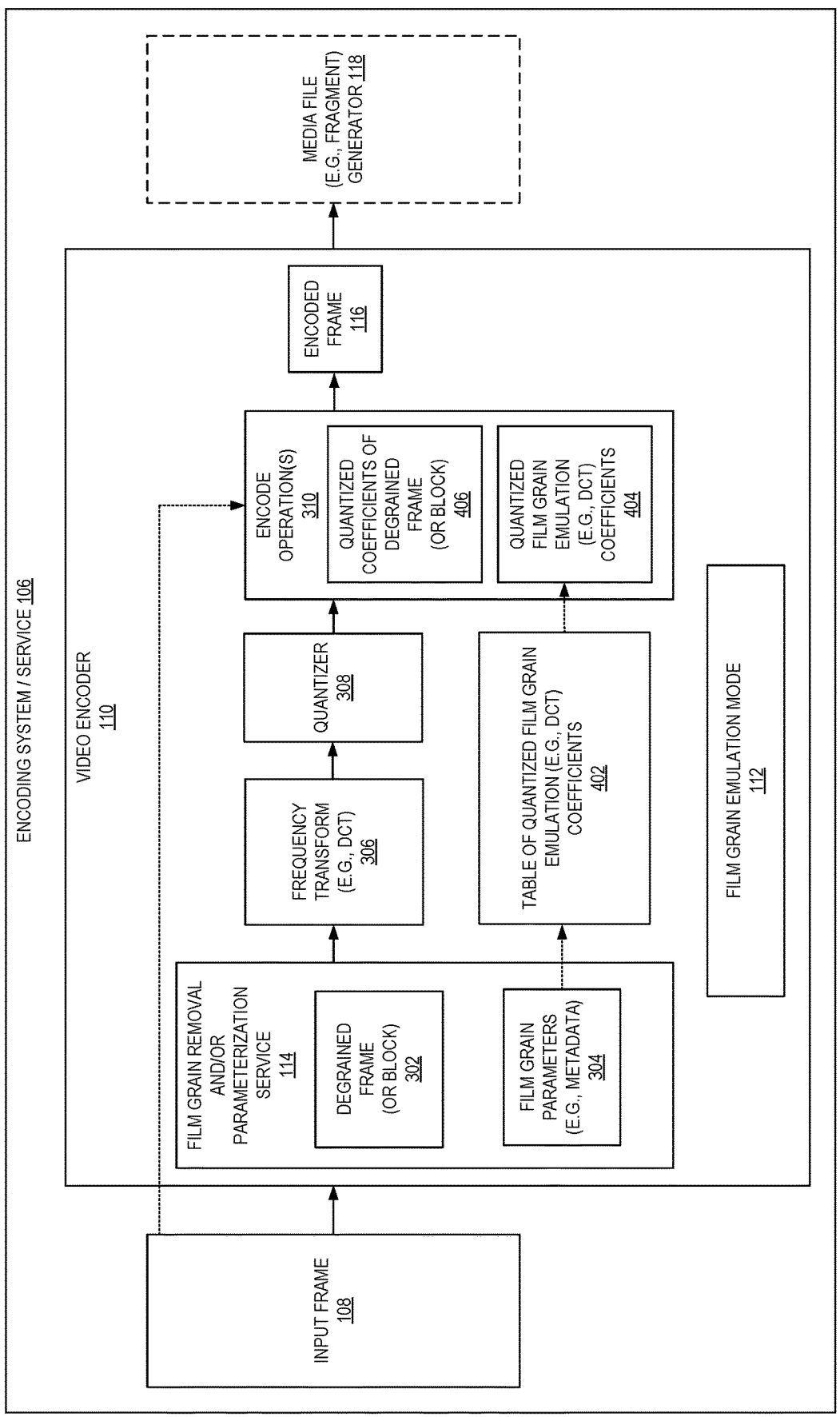
FIG. 4 is a diagram illustrating a video encoder including a film grain emulation mode that utilizes film grain emulation coefficients after quantization according to some embodiments.

FIG. 4 is a diagram illustrating a video encoder 110 including a film grain emulation mode 112 that utilizes film grain emulation coefficients 402 after quantization according to some embodiments. In certain embodiments (e.g., as in FIG. 3), non-quantized film grain emulation (e.g., frequency) coefficients are added to the (e.g., frequency) coefficients for the degrained frame before quantization. Certain embodiments of FIG. 4 allow for quantized film grain emulation (e.g., frequency) coefficients 404 to be added to the quantized (e.g., frequency) coefficients 406 for the degrained frame after its quantization, e.g., and that resultant then being encoded by encode operation(s) 310 to form encoded frame 116. In certain embodiments, the quantization matrix for each of quantized film grain emulation (e.g., frequency) coefficients 404 and quantized (e.g., frequency) coefficients 406 for the degrained frame is the same.

In certain embodiments, table of quantized film gram emulation (e.g., frequency) coefficients 402 is included. In certain embodiments, table 402 is indexed by film grain parameters (e.g., metadata), e.g., where film grain parameters 304 are used to look-up the corresponding set of quantized film grain emulation (e.g., DCT) coefficients. Table 402 is populated before using video encoder 110 in certain embodiments. In certain embodiments, table 402 is indexed by other data (e.g., in addition to or alternatively to film grain parameters (e.g., metadata)), e.g., where that data is used to look-up the corresponding set of film grain emulation (e.g., DCT) coefficients (e.g., as in Table 2 above). For example, indexed by a size of a block of a plurality of blocks of the frame (e.g., and the block's film grain parameters) and/or indexed by a quantization parameter (QP), e.g., the QP that is to be used to quantize the degrained frame 302 (or block thereof).

Figure 5:
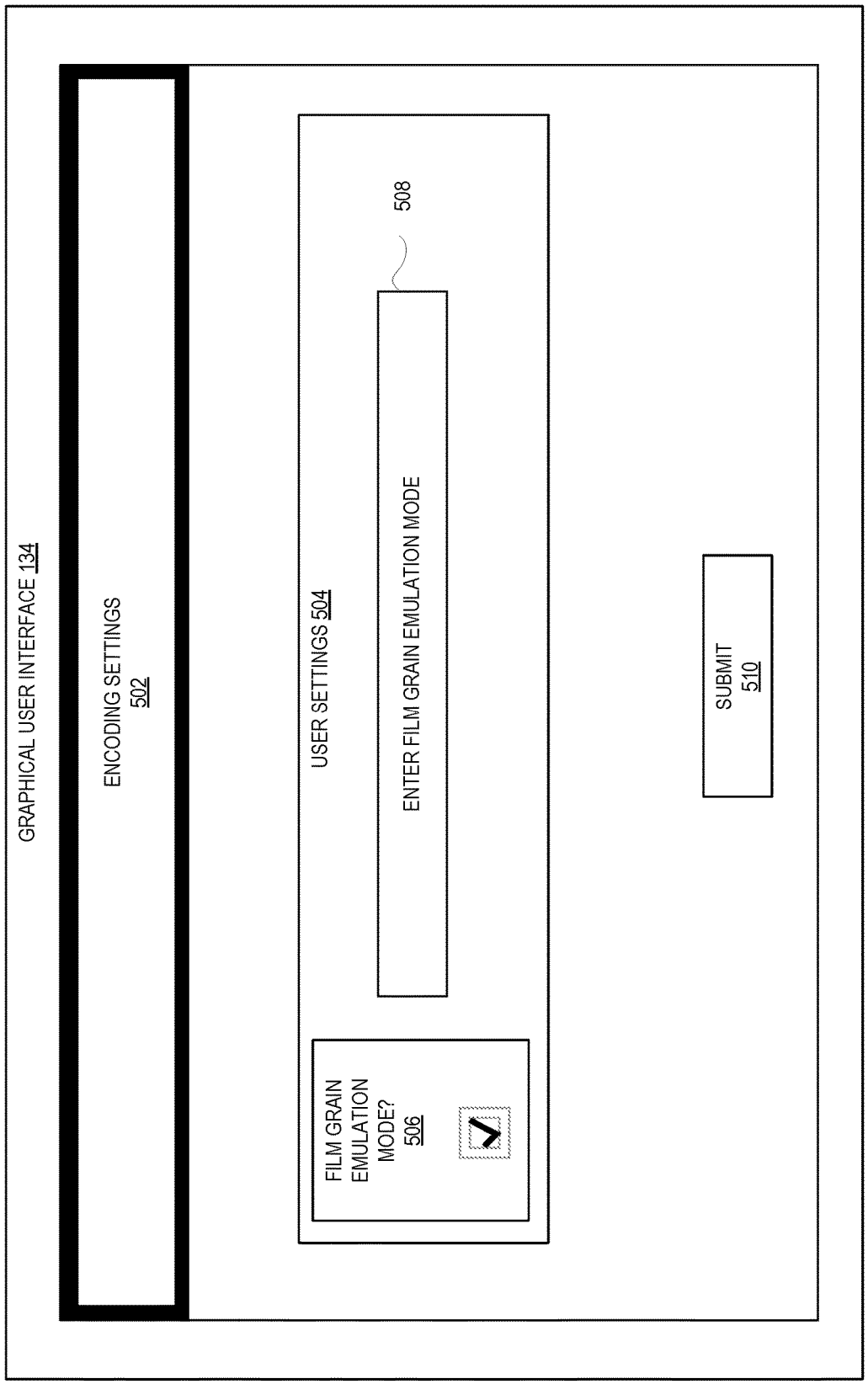
FIG. 5 is a diagram illustrating a graphical user interface for setting an encoder to a film grain emulation mode according to some embodiments.

FIG. 5 is a diagram illustrating a graphical user interface 134 for setting an encoder to a film grain emulation mode 112 according to some embodiments. Depicted graphical user interface 134 includes a field 502 that is customizable with text to indicate that these are encoding settings, a field 504 that is customizable with text to indicate that these are video (or image) encoding settings, an interface element 506 that, when selected, will cause the content delivery system/service to enter film grain emulation mode 112, and a field 508 that is customizable with text to indicate that selecting the interface element 506 is to cause entry into film grain emulation mode. A user may click the submit interface element 510 to (e.g., cause a command to be sent that causes) entry of a content delivery system/service into film grain emulation mode (e.g., film grain emulation mode 112 in FIGS. 1, 3, and 4). An interface element, may include, but is not limited to, a thumbs up (or down), checkbox, button, dropdown menu, etc.

Figure 6:
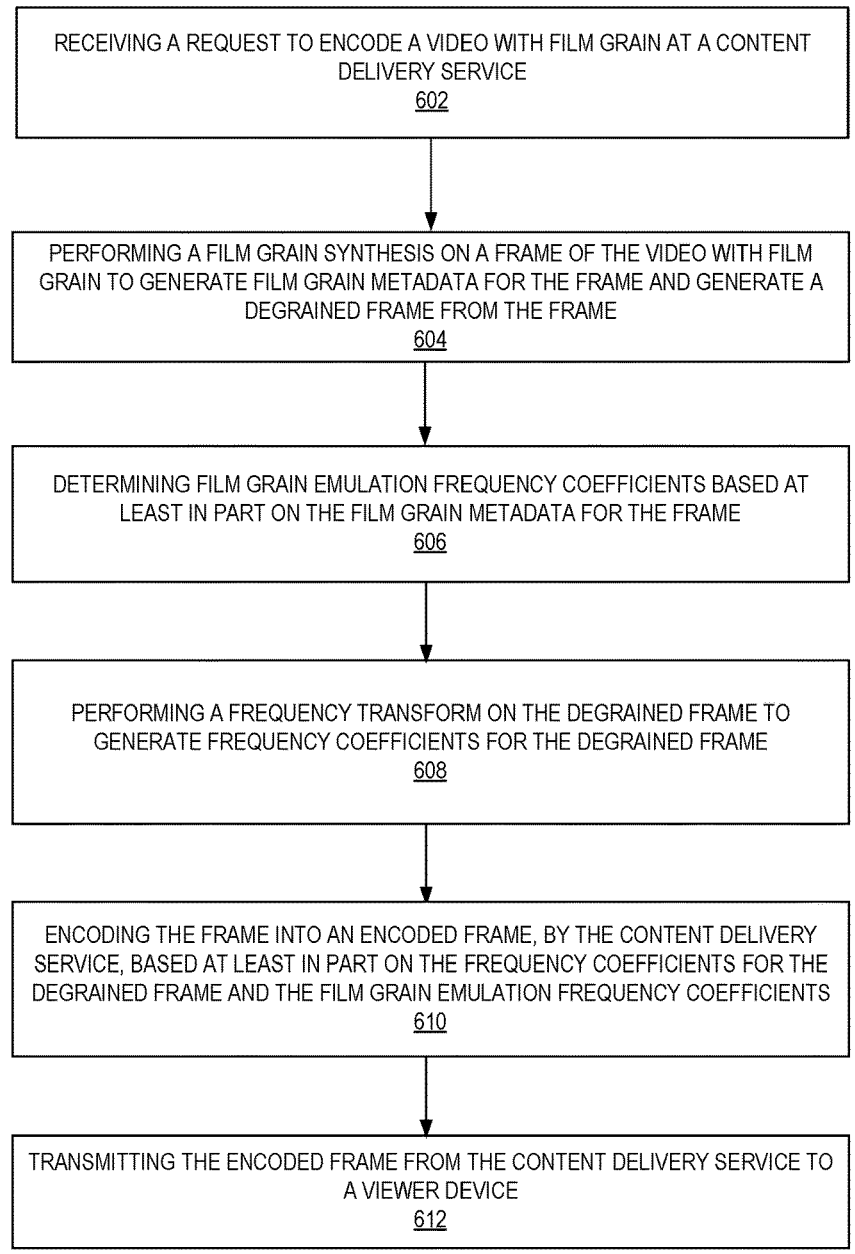
FIG. 6 is a flow diagram illustrating operations of a method for encoding a frame with film grain emulation according to some embodiments.

FIG. 6 is a flow diagram illustrating operations 600 of a method for encoding a frame with film grain emulation according to some embodiments. Some or all of the operations 600 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 600 are performed by content delivery system/service (or a component thereof) of the other figures.

The operations 600 include, at block 602, receiving a request to encode a video with film grain at a content delivery service. The operations 600 further include, at block 604, performing a film grain synthesis on a frame of the video with film grain to generate film grain metadata for the frame and generate a degrained frame from the frame. The operations 600 further include, at block 606, determining film grain emulation frequency coefficients based at least in part on the film grain metadata for the frame. The operations 600 further include, at block 608, performing a frequency transform on the degrained frame to generate frequency coefficients for the degrained frame. The operations 600 further include, at block 610, encoding the frame into an encoded frame, by the content delivery service, based at least in part on the frequency coefficients for the degrained frame and the film grain emulation frequency coefficients. The operations 600 further include, at block 612, transmitting the encoded frame from the content delivery service to a viewer device.

Additionally or alternatively, embodiments herein provide for the dynamic scaling of film grain analysis/removal/synthesis for multiple resolution output. In one embodiment, a content delivery system provides a plurality of different multimedia representations for possible bitrates and/or resolutions of the same multimedia file (e.g., a single multimedia title), for example, to deliver high (e.g., the highest) multimedia quality to a device of a plurality of devices with a varying set of capabilities and/or varying client bandwidth capacity, e.g., and adjusts the quality of the multimedia stream between multiple bitrates and/or resolutions. With adaptive bitrate (ABR) video, certain embodiments deliver the same content at a variety of frame sizes, e.g., from 3840×2160 to 400×224, a 93:1 ratio in total pixels.

Film grain is one of the most difficult things to encode, as it is spatially and temporally random. Certain codecs may have the ability to synthesize film grain on playback, e.g., by analyzing the grain in the source, parameterize it into metadata so it can be reconstructed similarly, and remove the grain from the content before encoding to improve quality/reduce bitrate. The analysis and removal process is expensive, and best practices have yet to emerge as to whether it is better done once at the maximum resolution, or for each output resolution.

But film grain is not truly random, e.g., where the grain is from small particles in the film stock itself. And while the frequency and distribution of those particles is random, other characteristics like size of particle, the sharpness of their edges, in certain embodiments, the variation in their shape, and the amount in different colors are much more predictable, and result in the specifics of the film stock used and how it was processed.

Embodiments herein take the analysis from the source or the highest encoded resolution and applies the understanding of the grain particles to determine what the metadata should be for lower resolutions without requiring additional analysis and/or processing, e.g., where the number of particles of grain per frame would remain largely the same, but their size would be scaled proportionally. The net effect is that encoding neutral gray film stock test samples at different resolutions would result in clips that reproduce similar looking grain at multiple resolutions, as the size, sharpness, distribution, and color characteristics will be maintained or scaled as appropriate.

The classification of the grain at the reference resolution can also be reused when removing grain from lower resolutions. Knowing the scale-corrected size, shape, etc. of the grain, a degraining filter (e.g., of film grain removal and/or parameterization service 114 of encoding system/service 106 in FIG. 1) focuses on removing grain elements that will be reproduced by the metadata, while leaving textured elements that do not match the grain characteristics alone. This will result in faster degraining and more accurate removal of just the grain to be reproduced.

It also can enable in-codec noise reduction instead of a preprocessing pass. For example, the grain's frequency characteristics can be targeted in adaptive dead zone filtering of the frequency transform (e.g., DCT), a much faster filtering mechanism and one which can more directly interact with rate control, potentially improving low-bitrate quality.

When encoding for a codec that does not include film grain synthesis, grain parameterization can be used to understand what frequency coefficients are for the random grain versus what frequency coefficients are for the image data, and apply more efficient ways of encoding the grain/noise texture while preserving content details, e.g., according to the optimization of film grain encoding for non-FGS codecs discussed herein.

Exemplary environments, systems, etc. that the above may be used in are detailed below.

At least some embodiments of the disclosed technologies can be described in view of the following examples:

Example 1. A computer-implemented method comprising:
receiving a request to encode a video with film grain at a content delivery service;
performing a film grain synthesis on a frame of the video with film grain to generate film grain metadata for the frame and generate a degrained frame from the frame;
determining film grain emulation frequency coefficients based at least in part on the film grain metadata for the frame;
performing a frequency transform on the degrained frame to generate frequency coefficients for the degrained frame;
encoding the frame into an encoded frame, by the content delivery service, based at least in part on the frequency coefficients for the degrained frame and the film grain emulation frequency coefficients; and
transmitting the encoded frame from the content delivery service to a viewer device.

Example 2. The computer-implemented method of example 1, wherein the film grain metadata is not transmitted to the viewer device.

Example 3. The computer-implemented method of example 1, wherein the determining the film grain emulation frequency coefficients comprises determining a first set of film grain emulation frequency coefficients for a first block of a plurality of blocks of the frame, and the encoding is based at least in part on each of the plurality of blocks of the frame including the first set of film grain emulation frequency coefficients.

Example 4. A computer-implemented method comprising:
receiving a request to encode a video with film grain at a content delivery service;
performing a film grain removal on a frame of the video with film grain to generate film grain parameters for the frame and generate a degrained frame from the frame;
determining film grain emulation frequency coefficients based at least in part on the film grain parameters for the frame;
performing a frequency transform on the degrained frame to generate frequency coefficients for the degrained frame;
encoding the frame into an encoded frame based at least in part on the frequency coefficients for the degrained frame and the film grain emulation frequency coefficients; and
transmitting the encoded frame from the content delivery service to a viewer device.

Example 5. The computer-implemented method of example 4, wherein the film grain parameters are not transmitted to the viewer device.

Example 6. The computer-implemented method of example 4, wherein the determining the film grain emulation frequency coefficients comprises determining a first set of film grain emulation frequency coefficients for a first block of a plurality of blocks of the frame, and the encoding is based at least in part on each of the plurality of blocks of the frame including the first set of film grain emulation frequency coefficients.

Example 7. The computer-implemented method of example 6, further comprising adding each film grain emulation frequency coefficient of the first set of film grain emulation frequency coefficients to a corresponding frequency coefficient of each of the plurality of blocks of the degrained frame to form a coefficient matrix, wherein the encoding is performed on the coefficient matrix.

Example 8. The computer-implemented method of example 7, further comprising quantizing the coefficients matrix to form a quantized coefficient matrix, wherein the encoding is performed on the quantized coefficient matrix.

Example 9. The computer-implemented method of example 8, wherein the quantizing is for a same quantization parameter for the frame.

Example 10. The computer-implemented method of example 4, wherein the encoding is entropy encoding.

Example 11. The computer-implemented method of example 4, further comprising encoding a second frame of the video into an encoded second frame, wherein the second frame includes film grain during the encoding, and transmitting the encoded second frame from the content delivery service to the viewer device.

Example 12. The computer-implemented method of example 4, further comprising generating a plurality of sets of film grain emulation frequency coefficients, including the film grain emulation frequency coefficients, for respective film stocks before receiving the request to encode.

Example 13. The computer-implemented method of example 4, wherein the determining the film grain emulation frequency coefficients comprises determining the film grain emulation frequency coefficients based at least in part on the film grain parameters for the frame from a table of sets of film grain emulation frequency coefficients indexed by their film grain parameters.

Example 14. The computer-implemented method of example 4, wherein the determining the film grain emulation frequency coefficients comprises determining the film grain emulation frequency coefficients based at least in part on the film grain parameters for the frame and a size of a first block of a plurality of blocks of the frame from a table of sets of film grain emulation frequency coefficients indexed by their film grain parameters and their block size.

Example 15. A system comprising:
a content data store to store a video; and
one or more electronic devices to implement a content delivery service, the content delivery service including instructions that upon execution cause the content delivery service to perform operations comprising:
receiving a request to encode the video with film grain,
performing a film grain removal on a frame of the video with film grain to generate film grain parameters for the frame and generate a degrained frame from the frame,
determining film grain emulation frequency coefficients based at least in part on the film grain parameters for the frame,
performing a frequency transform on the degrained frame to generate frequency coefficients for the degrained frame,
encoding the frame into an encoded frame based at least in part on the frequency coefficients for the degrained frame and the film grain emulation frequency coefficients, and
transmitting the encoded frame from the content delivery service to a viewer device.

Example 16. The system of example 15, wherein the instructions upon execution cause the content delivery service to perform operations wherein the film grain parameters are not transmitted to the viewer device.

Example 17. The system of example 15, wherein the instructions upon execution cause the content delivery service to perform operations wherein the determining the film grain emulation frequency coefficients comprises determining a first set of film grain emulation frequency coefficients for a first block of a plurality of blocks of the frame, and the encoding is based at least in part on each of the plurality of blocks of the frame including the first set of film grain emulation frequency coefficients.

Example 18. The system of example 17, wherein the instructions upon execution cause the content delivery service to perform operations further comprising adding each film grain emulation frequency coefficient of the first set of film grain emulation frequency coefficients to a corresponding frequency coefficient of each of the plurality of blocks of the degrained frame to form a coefficient matrix, wherein the encoding is performed on the coefficient matrix.

Example 19. The system of example 18, wherein the instructions upon execution cause the content delivery service to perform operations further comprising quantizing the coefficients matrix to form a quantized coefficient matrix, wherein the encoding is performed on the quantized coefficient matrix.

Example 20. The system of example 15, wherein the instructions upon execution cause the content delivery service to perform operations further comprising encoding a second frame of the video into an encoded second frame, wherein the second frame includes film grain during the encoding, and transmitting the encoded second frame from the content delivery service to the viewer device.

Figure 7:
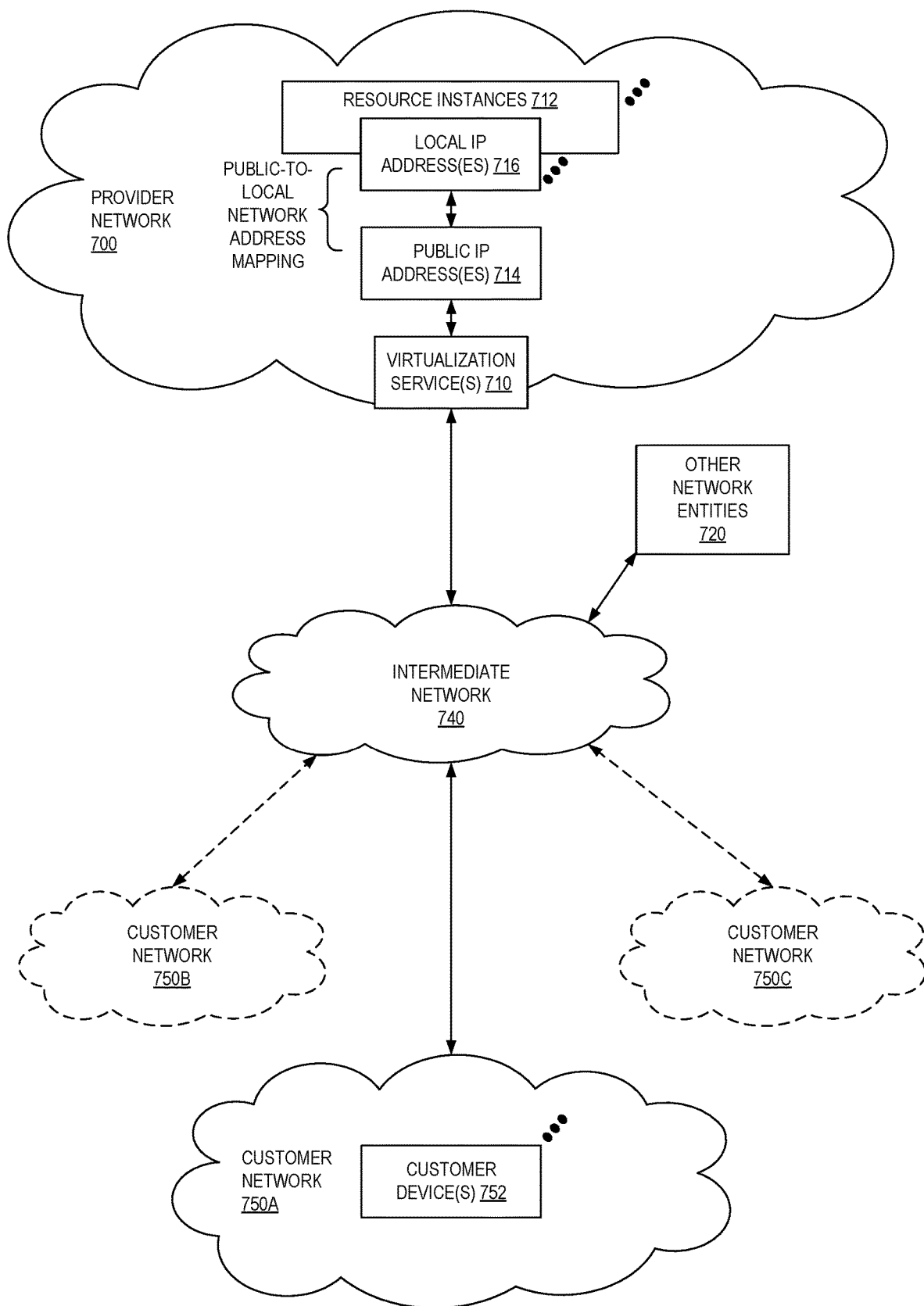
FIG. 7 illustrates an example provider network environment according to some embodiments.

FIG. 7 illustrates an example provider network (or "service provider system") environment according to some embodiments. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 may be associated with the resource instances 712; the local IP addresses are the internal network addresses of the resource instances 712 on the provider network 700. In some embodiments, the provider network 700 may also provide public IP addresses 714 and/or public IP address ranges (e.g., Internet Protocol version 4 (IPv4) or Internet Protocol version 6 (IPv6) addresses) that customers may obtain from the provider 700.

Conventionally, the provider network 700, via the virtualization services 710, may allow a customer of the service provider (e.g., a customer that operates one or more client networks 750A-750C including one or more customer device(s) 752) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network(s) 750A-750C may, for example, implement customer-specific applications and present the customer's applications on an intermediate network 740, such as the Internet. Other network entities 720 on the intermediate network 740 may then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
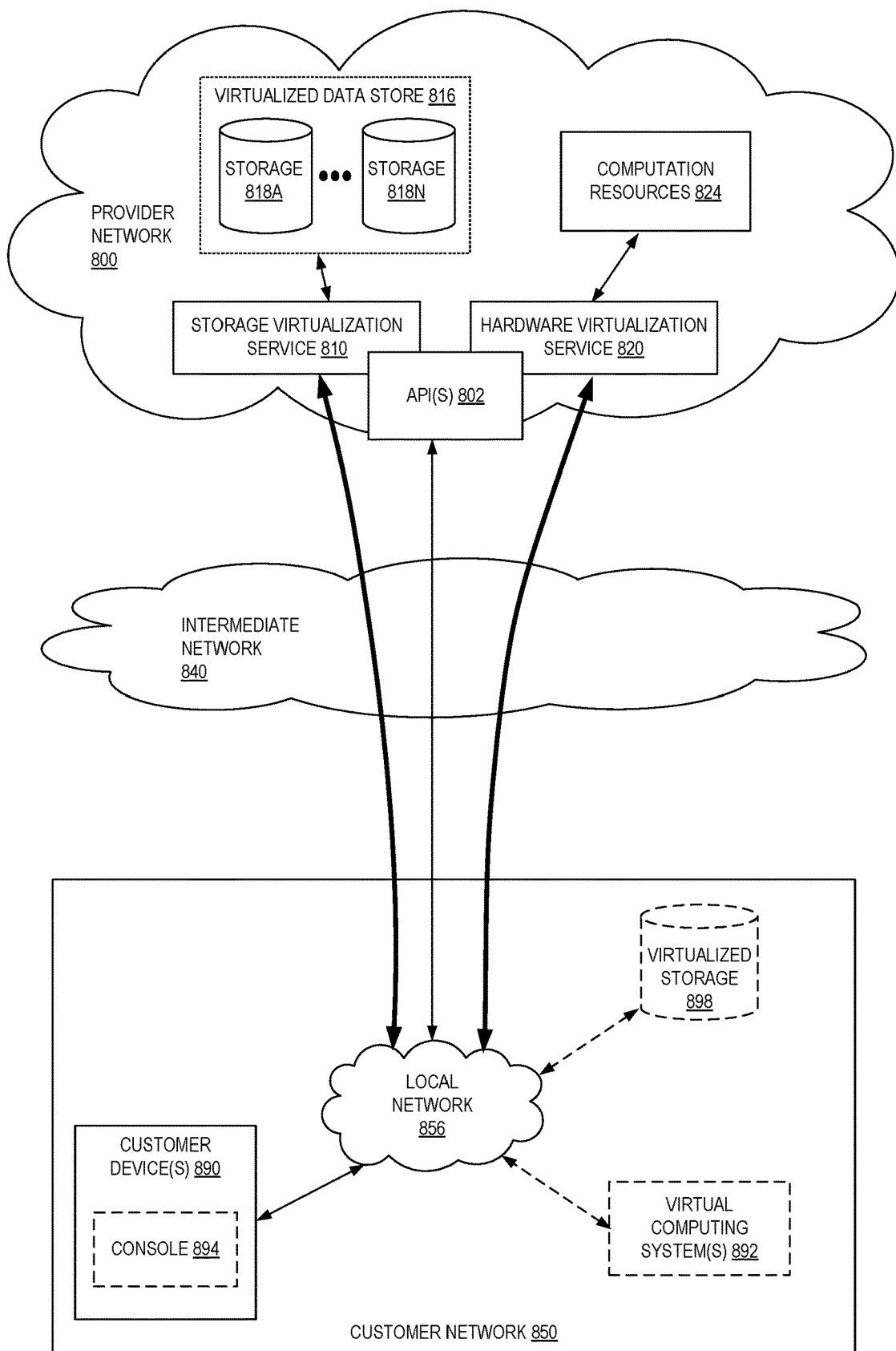
FIG. 8 is a block diagram of an example provider network that provides a storage service and a hardware virtualization service to customers according to some embodiments.

FIG. 8 is a block diagram of an example provider network that provides a storage service and a hardware virtualization service to customers, according to some embodiments. Hardware virtualization service 820 provides multiple computation resources 824 (e.g., VMs) to customers. The computation resources 824 may, for example, be rented or leased to customers of the provider network 800 (e.g., to a customer that implements customer network 850). Each computation resource 824 may be provided with one or more local IP addresses. Provider network 800 may be configured to route packets from the local IP addresses of the computation resources 824 to public Internet destinations, and from public Internet sources to the local IP addresses of computation resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example a web services interface, via which a customer network 850 may access functionality provided by the hardware virtualization service 820, for example via a console 894 (e.g., a web-based application, standalone application, mobile application, etc.). In some embodiments, at the provider network 800, each virtual computing system 892 at customer network 850 may correspond to a computation resource 824 that is leased, rented, or otherwise provided to customer network 850.

From an instance of a virtual computing system 892 and/or another customer device 890 (e.g., via console 894), the customer may access the functionality of storage service 810, for example via one or more APIs 802, to access data from and store data to storage resources 818A-818N of a virtual data store 816 (e.g., a folder or "bucket", a virtualized volume, a database, etc.) provided by the provider network 800. In some embodiments, a virtualized data store gateway (not shown) may be provided at the customer network 850 that may locally cache at least some data, for example frequently accessed or critical data, and that may communicate with storage service 810 via one or more communications channels to upload new or modified data from a local cache so that the primary store of data (virtualized data store 816) is maintained. In some embodiments, a user, via a virtual computing system 892 and/or on another customer device 890, may mount and access virtual data store 816 volumes via storage service 810 acting as a storage virtualization service, and these volumes may appear to the user as local (virtualized) storage 898.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network.

Illustrative System

Figure 9:
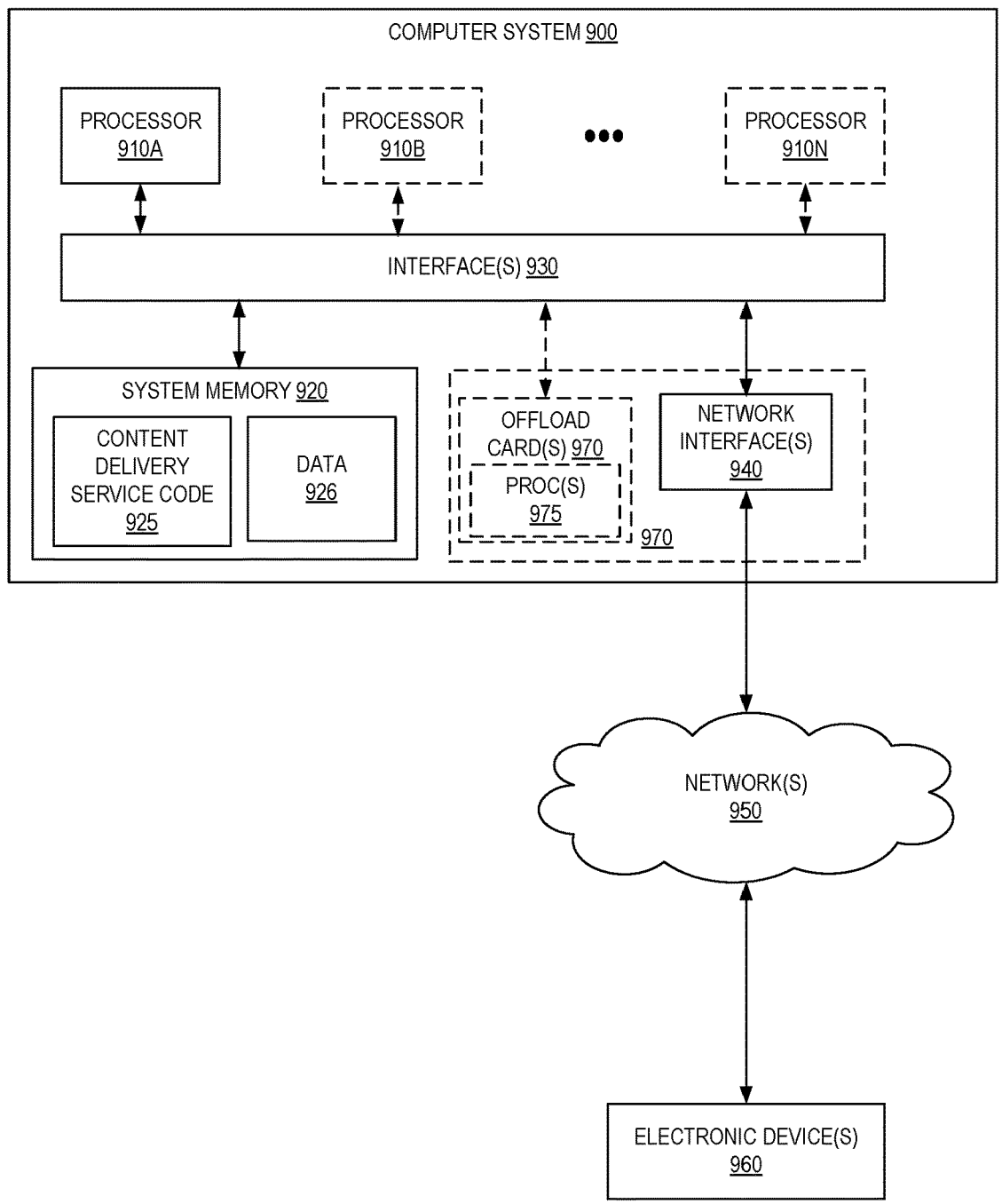
FIG. 9 is a block diagram illustrating an example computer system that may be used in some embodiments.

In some embodiments, a system that implements a portion or all of the techniques for content indexing as described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 920 as content delivery service code 925 (e.g., executable to implement, in whole or in part, the content delivery service 102) and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing, or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 900 includes one or more offload cards 970 (including one or more processors 975, and possibly including the one or more network interfaces 940) that are connected using an I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 900 may act as a host electronic device (e.g., operating as part of a hardware virtualization service) that hosts compute instances, and the one or more offload cards 970 execute a virtualization manager that can manage compute instances that execute on the host electronic device. As an example, in some embodiments the offload card(s) 970 can perform compute instance management operations such as pausing and/or un-pausing compute instances, launching and/or terminating compute instances, performing memory transfer/copying operations, etc. These management operations may, in some embodiments, be performed by the offload card(s) 970 in coordination with a hypervisor (e.g., upon a request from a hypervisor) that is executed by the other processors 910A-910N of the computer system 900. However, in some embodiments the virtualization manager implemented by the offload card(s) 970 can accommodate requests from other entities (e.g., from compute instances themselves), and may not coordinate with (or service) any separate hypervisor.

In some embodiments, system memory 920 may be one embodiment of a computer-accessible medium configured to store program instructions and data as described above. However, in other embodiments, program instructions and/or data may be received, sent, or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Figure 10:
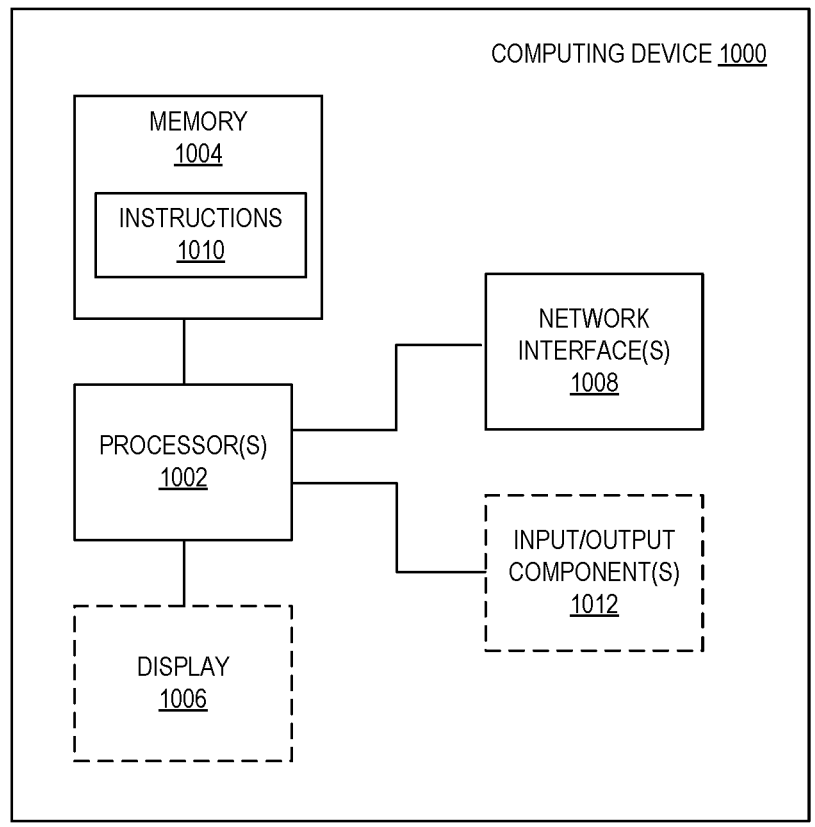
FIG. 10 illustrates a logical arrangement of a set of general components of an exemplary computing device that can be utilized in accordance with various embodiments.

FIG. 10 illustrates a logical arrangement of a set of general components of an example computing device 1000. Generally, a computing device 1000 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 1002 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 1004) to store code (for example, instructions 1010, e.g., which implement a content delivery service as disclosed herein), and a set of one or more wired or wireless network interfaces 1008 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 1004) of a given electronic device typically stores code (e.g., instructions 1010) for execution on the set of one or more processors 1002 of that electronic device. One or more parts of various embodiments may be implemented using different combinations of software, firmware, and/or hardware.

A computing device 1000 can include some type of display element 1006, such as a touch screen or liquid crystal display (LCD), although many devices such as portable media players might convey information via other means, such as through audio speakers, and other types of devices such as server end stations may not have a display element 1006 at all. As discussed, some computing devices used in some embodiments include at least one input and/or output component(s) 1012 able to receive input from a user. This input component can include, for example, a push button, touch pad, touch screen, wheel, joystick, keyboard, mouse, keypad, or any other such device or element whereby a user is able to input a command to the device. In some embodiments, however, such a device might be controlled through a combination of visual and/or audio commands and utilize a microphone, camera, sensor, etc., such that a user can control the device without having to be in physical contact with the device.

Figure 11:
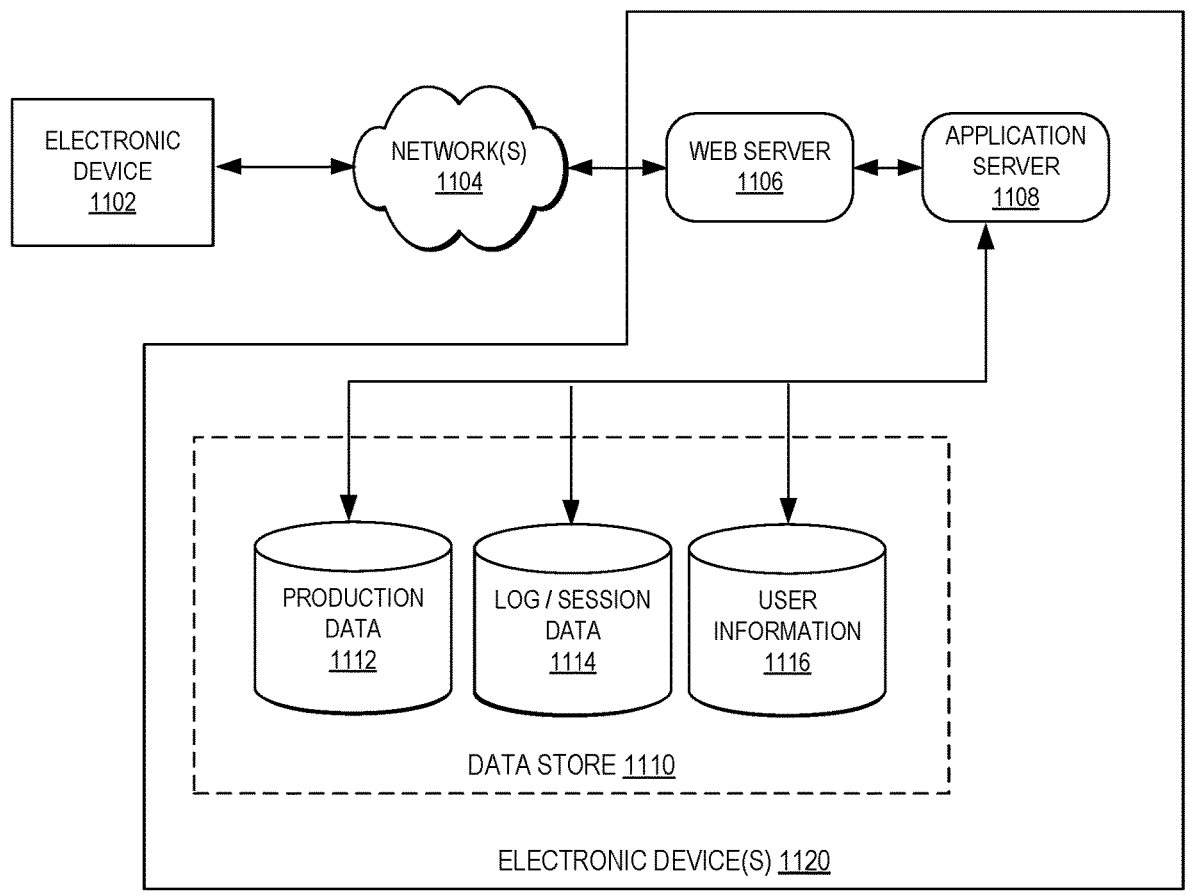
FIG. 11 illustrates an example of an environment for implementing aspects in accordance with various embodiments.

As discussed, different approaches can be implemented in various environments in accordance with the described embodiments. For example, FIG. 11 illustrates an example of an environment 1100 for implementing aspects in accordance with various embodiments. For example, in some embodiments messages are HyperText Transfer Protocol (HTTP) requests that are received by a web server (e.g., web server 1106), and the users, via electronic devices, may interact with the provider network via a web portal provided via the web server 1106 and application server 1108. As will be appreciated, although a web-based environment is used for purposes of explanation, different environments may be used, as appropriate, to implement various embodiments. The system includes an electronic client device 1102, which may also be referred to as a client device and can be any appropriate device operable to send and receive requests, messages, or information over an appropriate network 1104 and convey information back to a user of the device 1102. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1104 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1104 includes the Internet, as the environment includes a web server 1106 for receiving requests and serving content in response thereto, although for other networks an alternative device serving a similar purpose could be used, as would be apparent to one of ordinary skill in the art.

The illustrative environment includes at least one application server 1108 and a data store 1110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server 1108 can include any appropriate hardware and software for integrating with the data store 1110 as needed to execute aspects of one or more applications for the client device 1102 and handling a majority of the data access and business logic for an application. The application server 1108 provides access control services in cooperation with the data store 1110 and is able to generate content such as text, graphics, audio, video, etc., to be transferred to the client device 1102, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1102 and the application server 1108, can be handled by the web server 1106. It should be understood that the web server 1106 and application server 1108 are not required and are merely example components, as structured code discussed herein can be executed on any appropriate device or host machine as discussed elsewhere herein.

The data store 1110 can include several separate data tables, databases, or other data storage mechanisms and media for storing data relating to a particular aspect. For example, the data store illustrated includes mechanisms for storing production data 1112 and user information 1116, which can be used to serve content for the production side. The data store 1110 also is shown to include a mechanism for storing log or session data 1114. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update, or otherwise process data in response thereto. In one example, a user might submit a search request for a certain type of item. In this case, the data store 1110 might access the user information 1116 to verify the identity of the user and can access a production data 1112 to obtain information about items of that type. The information can then be returned to the user, such as in a listing of results on a web page that the user is able to view via a browser on the user device 1102. Information for a particular item of interest can be viewed in a dedicated page or window of the browser.

The web server 1106, application server 1108, and/or data store 1110 may be implemented by one or more electronic devices 1120, which can also be referred to as electronic server devices or server end stations, and may or may not be located in different geographic locations. Each of the one or more electronic devices 1120 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the environment 1100 in FIG. 11 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program code, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 818A-818N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving a request to encode a video with film grain at a content delivery service;
performing a film grain synthesis on a frame of the video with film grain to generate film grain metadata for the frame and generate a degrained frame from the frame;
determining film grain emulation frequency coefficients based at least in part on the film grain metadata for the frame;
performing a frequency transform on the degrained frame to generate frequency coefficients for the degrained frame;
encoding the frame into an encoded frame including emulated film grain therein, by the content delivery service, based at least in part on the frequency coefficients for the degrained frame and the film grain emulation frequency coefficients; and transmitting the encoded frame from the content delivery service to a viewer device without transmitting the film grain metadata to the viewer device.

2. The computer-implemented method of claim 1, wherein the viewer device does not support film grain synthesis for a decode of the encoded frame.

3. The computer-implemented method of claim 1, wherein the determining the film grain emulation frequency coefficients comprises determining a first set of film grain emulation frequency coefficients for a first block of a plurality of blocks of the frame, and the encoding is based at least in part on each of the plurality of blocks of the frame including the first set of film grain emulation frequency coefficients.

4. A computer-implemented method comprising:
receiving a request to encode a video with film grain at a content delivery service;
performing a film grain removal on a frame of the video with film grain to generate film grain parameters for the frame and generate a degrained frame from the frame;
determining film grain emulation frequency coefficients based at least in part on the film grain parameters for the frame;
performing a frequency transform on the degrained frame to generate frequency coefficients for the degrained frame;
encoding the frame into an encoded frame including emulated film grain therein based at least in part on the frequency coefficients for the degrained frame and the film grain emulation frequency coefficients; and
transmitting the encoded frame from the content delivery service to a viewer device without transmitting the film grain parameters to the viewer device.

5. The computer-implemented method of claim 4, wherein the viewer device does not support film grain synthesis for a decode of the encoded frame.

6. The computer-implemented method of claim 4, wherein the determining the film grain emulation frequency coefficients comprises determining a first set of film grain emulation frequency coefficients for a first block of a plurality of blocks of the frame, and the encoding is based at least in part on each of the plurality of blocks of the frame including the first set of film grain emulation frequency coefficients.

7. The computer-implemented method of claim 6, further comprising adding each film grain emulation frequency coefficient of the first set of film grain emulation frequency coefficients to a corresponding frequency coefficient of each of the plurality of blocks of the degrained frame to form a coefficient matrix, wherein the encoding is performed on the coefficient matrix.

8. The computer-implemented method of claim 7, further comprising quantizing the coefficients matrix to form a quantized coefficient matrix, wherein the encoding is performed on the quantized coefficient matrix.

9. The computer-implemented method of claim 8, wherein the quantizing is for a same quantization parameter for the frame.

10. The computer-implemented method of claim 4, wherein the encoding is entropy encoding.

11. The computer-implemented method of claim 4, further comprising encoding a second frame of the video into an encoded second frame, wherein the second frame includes film grain during the encoding, and transmitting the encoded second frame from the content delivery service to the viewer device.

12. The computer-implemented method of claim 4, further comprising generating a plurality of sets of film grain emulation frequency coefficients, including the film grain emulation frequency coefficients, for respective film stocks before receiving the request to encode.

13. The computer-implemented method of claim 4, wherein the determining the film grain emulation frequency coefficients comprises determining the film grain emulation frequency coefficients based at least in part on the film grain parameters for the frame from a table of sets of film grain emulation frequency coefficients indexed by their film grain parameters.

14. The computer-implemented method of claim 4, wherein the determining the film grain emulation frequency coefficients comprises determining the film grain emulation frequency coefficients based at least in part on the film grain parameters for the frame and a size of a first block of a plurality of blocks of the frame from a table of sets of film grain emulation frequency coefficients indexed by their film grain parameters and their block size.

15. A system comprising:
a content data store to store a video; and
one or more electronic devices to implement a content delivery service, the content delivery service including instructions that upon execution cause the content delivery service to perform operations comprising:
receiving a request to encode the video with film grain,
performing a film grain removal on a frame of the video with film grain to generate film grain parameters for the frame and generate a degrained frame from the frame,
determining film grain emulation frequency coefficients based at least in part on the film grain parameters for the frame,
performing a frequency transform on the degrained frame to generate frequency coefficients for the degrained frame,
encoding the frame into an encoded frame including emulated film grain therein based at least in part on the frequency coefficients for the degrained frame and the film grain emulation frequency coefficients, and
transmitting the encoded frame from the content delivery service to a viewer device without transmitting the film grain parameters to the viewer device.

16. The system of claim 15, wherein the viewer device does not support film grain synthesis for a decode of the encoded frame.

17. The system of claim 15, wherein the instructions upon execution cause the content delivery service to perform operations wherein the determining the film grain emulation frequency coefficients comprises determining a first set of film grain emulation frequency coefficients for a first block of a plurality of blocks of the frame, and the encoding is based at least in part on each of the plurality of blocks of the frame including the first set of film grain emulation frequency coefficients.

18. The system of claim 17, wherein the instructions upon execution cause the content delivery service to perform operations further comprising adding each film grain emulation frequency coefficient of the first set of film grain emulation frequency coefficients to a corresponding frequency coefficient of each of the plurality of blocks of the degrained frame to form a coefficient matrix, wherein the encoding is performed on the coefficient matrix.

19. The system of claim 18, wherein the instructions upon execution cause the content delivery service to perform operations further comprising quantizing the coefficients matrix to form a quantized coefficient matrix, wherein the encoding is performed on the quantized coefficient matrix.

20. The system of claim 15, wherein the instructions upon execution cause the content delivery service to perform operations further comprising encoding a second frame of the video into an encoded second frame, wherein the second frame includes film grain during the encoding, and transmitting the encoded second frame from the content delivery service to the viewer device.

21. A computer-implemented method comprising:
  receiving a request to encode a video with film grain at a content delivery service;
  performing a film grain removal on a frame of the video with film grain to generate film grain parameters for the frame and generate a degrained frame from the frame;
  determining film grain emulation frequency coefficients based at least in part on the film grain parameters for the frame and a size of a first block of a plurality of blocks of the frame from a data structure of sets of film grain emulation frequency coefficients indexed by their film grain parameters and their block size;
  performing a frequency transform on the degrained frame to generate frequency coefficients for the degrained frame;
  encoding the frame into an encoded frame based at least in part on the frequency coefficients for the degrained frame and the film grain emulation frequency coefficients; and
  transmitting the encoded frame from the content delivery service to a viewer device.

22. The computer-implemented method of claim 21, wherein the viewer device does not support film grain synthesis for a decode of the encoded frame.

* * * * *